(12) United States Patent
Yamamoto (10) Patent No.: US 11,843,299 B2
(45) Date of Patent: Dec. 12, 2023

(54) CONVEYANCE SYSTEM, MOVABLE ELEMENT, CONTROL APPARATUS, CONTROL METHOD, AND METHOD OF MANUFACTURING ARTICLES

(71) Applicant: CANON KABUSHIKI KAISHA, Tokyo (JP)

(72) Inventor: Takeshi Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 17/104,978

(22) Filed: Nov. 25, 2020

(65) Prior Publication Data
US 2021/0175787 A1 Jun. 10, 2021

(30) Foreign Application Priority Data

Dec. 6, 2019 (JP) .................................. 2019-221444

(51) Int. Cl.
*H02K 7/08* (2006.01)
*H02K 41/02* (2006.01)
*H02K 3/04* (2006.01)

(52) U.S. Cl.
CPC ............... *H02K 41/02* (2013.01); *H02K 3/04* (2013.01)

(58) Field of Classification Search
CPC ........ H02K 7/08; H02K 41/02; H02K 41/031; H02K 3/04
See application file for complete search history.

(56) References Cited

U.S. PATENT DOCUMENTS 6,208,045 B1 * 3/2001 Hazelton ................ H02K 41/03
414/935

FOREIGN PATENT DOCUMENTS

| CN | 105119463 A | 12/2015 |
| JP | H0412657 A | 1/1992 |
| JP | 2004343105 A | 12/2004 |
| JP | 2005-079368 A | 3/2005 |

* cited by examiner

*Primary Examiner* — Dang D Le
(74) *Attorney, Agent, or Firm* — Canon U.S.A., Inc. I.P. Division

(57) ABSTRACT

A conveyance system comprising a movable element including a first coil group and a second coil group, and a stator including a plurality of magnetic bodies disposed along the first direction so that the plurality of magnetic bodies are capable of facing the first coil group and the second coil group. The first coil group includes a plurality of first coils disposed along a first direction, and the second coil group includes a plurality of second coils disposed along a second direction intersecting with the first direction. In a case where electric current is applied to the first coil group or the second coil group, a force is generated between the movable element and the plurality of magnetic bodies. The movable element is capable of moving in the first direction along the plurality of magnetic bodies while an orientation of the movable element is controlled by the generated force.

10 Claims, 7 Drawing Sheets

CONVEYANCE SYSTEM, MOVABLE ELEMENT, CONTROL APPARATUS, CONTROL METHOD, AND METHOD OF MANUFACTURING ARTICLES

BACKGROUND

Field

The present disclosure relates to a conveyance system, a movable element, a control apparatus, a control method, and a method of manufacturing article.

Description of the Related Art

Conveyance systems are commonly used in production lines for industrial product assembly and in semiconductor exposure apparatuses, for example. Especially, a conveyance system in a production line conveys works, such as parts, between a plurality of stations in an automated production line or between production lines in a factory. A conveyance system is also used as a conveyance apparatus in a processing apparatus. Among those, conveyance systems using a movable magnet type linear motor have been discussed.

Conveyance systems using a linear motor include a guide apparatus, such as a linear guide, that involves mechanical contact. The conveyance systems using a guide apparatus, such as a linear guide, have an issue in decrease of productivity due to contaminants, such as wear fragments of rails and bearings, lubricants, and volatilized lubricants, from a sliding portion of the linear guide. There is also another issue in decrease of the lifetime of the linear guide due to increase in friction of the sliding portion during high-speed conveyance.

Japanese Patent Laid-Open No. 2005-079368 discusses a magnetic levitation conveyance apparatus that realizes contactless conveyance of a conveyance tray. According to Japanese Patent Laid-Open No. 2005-079368, two rows of permanent magnets for control in a conveyance direction (hereinafter, "X-direction") and for control in a levitation direction (hereinafter, "Z-direction") are disposed under a chamber along the conveyance direction of the conveyance tray. Furthermore, a row of permanent magnets for a horizontal direction (hereinafter, "Y-direction") perpendicular to the conveyance direction is disposed. On the conveyance tray, three sets of coils are disposed correspondingly to the permanent magnets.

SUMMARY

According to an aspect of the present disclosure, a conveyance system includes a movable element including a first coil group and a second coil group, wherein the first coil group includes a plurality of first coils disposed along a first direction, and the second coil group includes a plurality of second coils disposed along a second direction intersecting with the first direction, and a stator including a plurality of magnetic bodies disposed along the first direction so that the plurality of magnetic bodies are capable of facing the first coil group and the second coil group, wherein, in a case where electric current is applied to the first coil group or the second coil group, a force is generated between the movable element and the plurality of magnetic bodies; and wherein the movable element is capable of moving in the first direction along the plurality of magnetic bodies while an orientation of the movable element is controlled by the generated force.

Further features of the present disclosure will become apparent from the following description of exemplary embodiments with reference to the attached drawings.

DESCRIPTION OF THE EMBODIMENTS

The present disclosure is directed to a conveyance system that conveys a movable element without physical contact while controlling an orientation of the movable element and not requiring upsizing of a system configuration, a movable element, a control apparatus, a control method, and a method of manufacturing an article.

An apparatus discussed in Japanese Patent Laid-Open No. 2005-079368 includes at least three rows of coil arrays and has a large and complicated structure. If a coil for X and a coil for Y are disposed nearby with each other to reduce the structure size, the coil for Y that is supposed to face a permanent magnet for Y turns to facing the coil for X in consequence of a movable element displaced toward Y, for example, and therefore orientation control of the movable element becomes difficult.

First Exemplary Embodiment

A first exemplary embodiment of the present disclosure will be described below with reference to FIGS. 1A and 1B to 6.

Figure 1A:
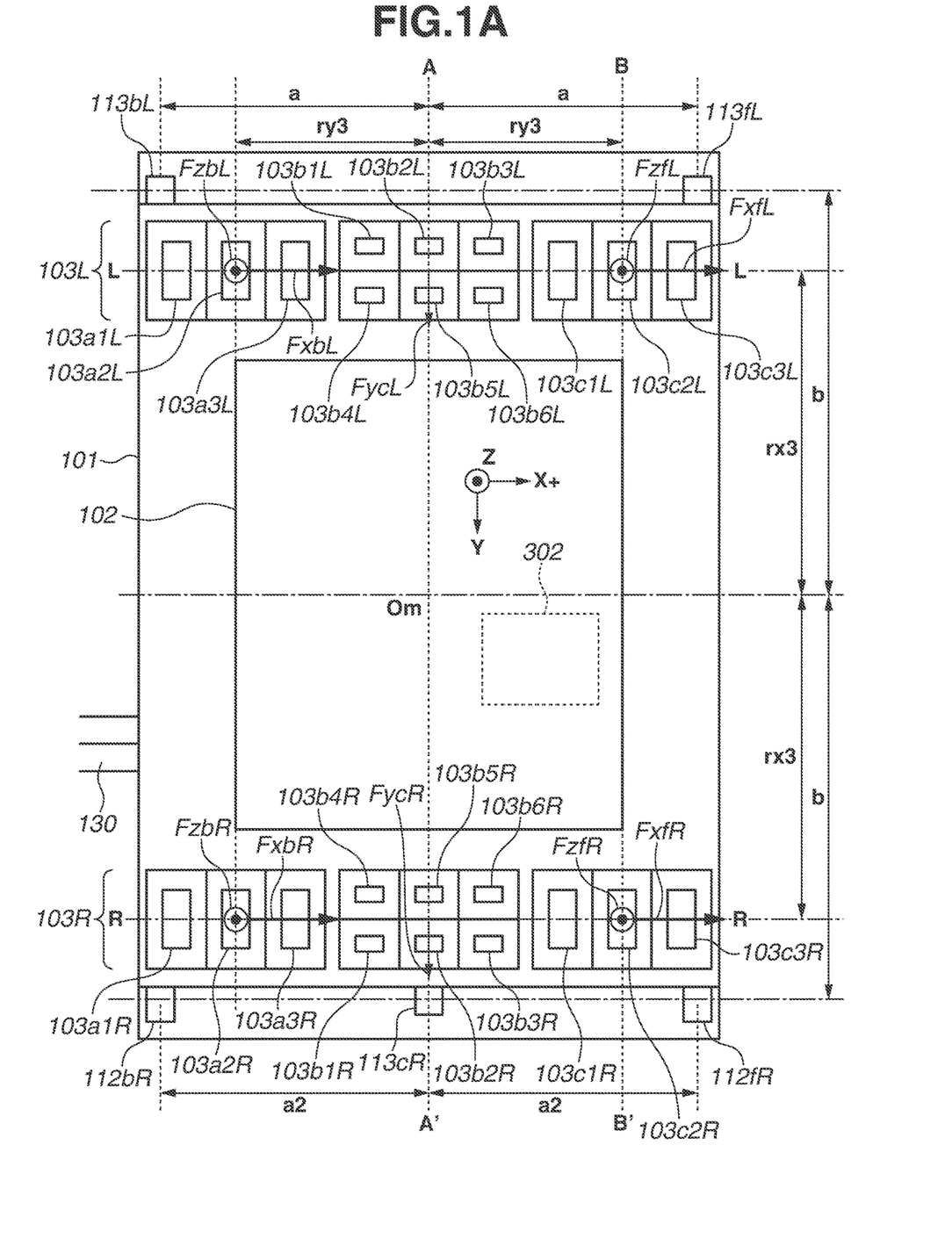
FIG. 1A is a schematic view illustrating a movable element of a conveyance system according to a first exemplary embodiment of the present disclosure.
Figure 1B:
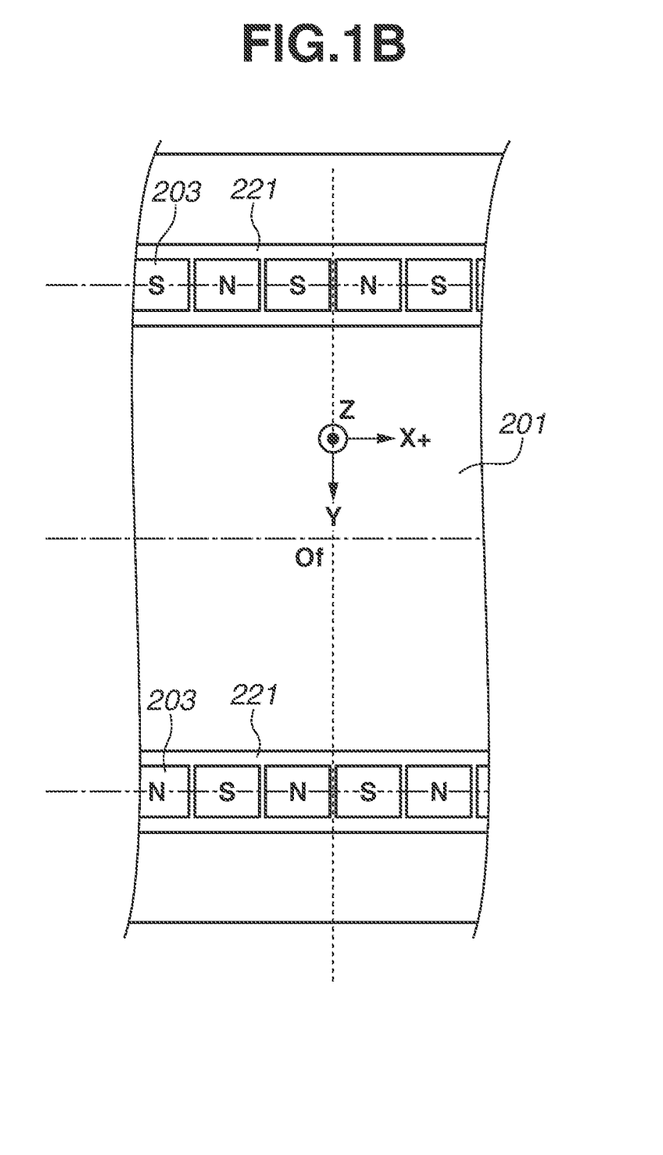
FIG. 1B is a schematic view illustrating a stator of the conveyance system according to the first exemplary embodiment of the present disclosure.

First, an entire configuration of a conveyance system 1 according to the present exemplary embodiment will be described below with reference to FIGS. 1A and 1B. FIGS. 1A and 1B are schematic views illustrating a movable element 101 and a stator 201 according to the present exemplary embodiment. FIG. 1A illustrates an extracted main portion of the movable element 101, and FIG. 1B illustrates an extracted main portion of the stator 201. Further, FIG. 1A is a view illustrating the movable element 101 viewed in a Z-direction, and FIG. 1B is a view illustrating the stator 201 viewed in a Y-direction. The Z- and Y-directions will be described below.

As illustrated in FIGS. 1A and 1B, the conveyance system 1 according to the present exemplary embodiment includes the movable element 101 and the stator 201. The movable element 101 is configured as a cart, slider, or carriage. The stator 201 is configured as a conveyance path. The conveyance system 1 is a conveyance system that includes a movable coil type linear motor. Further, the conveyance system 1 is a magnetic levitation type conveyance system that does not include a guide, such as a linear guide, and conveys the movable element 101 on the stator 201 without physical contact with the movable element 101.

The conveyance system 1, for example, conveys the movable element 101 using the stator 201 and conveys a work 102 on the movable element 101 to a processing apparatus for processing the work 102. While FIGS. 1A and 1B illustrate one movable element 101 with respect to the stator 201, the present exemplary embodiment is not limited to the illustrations. The conveyance system 1 can convey a plurality of movable elements 101 on the stator 201.

Coordinate axes and directions used herein will be defined as follows. First, an X-axis is defined along a horizontal direction that is a conveyance direction of the movable element 101, and the conveyance direction of the movable element 101 is defined as "X-direction". In the present specification, the X-direction is sometimes referred to as "first direction". A Z-axis is defined along a vertical direction that is a direction perpendicular to the X-direction, and the vertical direction is defined as "Z-direction". A Y-axis is defined along a direction perpendicular to the X- and Z-directions, and the direction perpendicular to the X- and Z-directions is defined as "Y-direction". Rotations about the X-, Y-, and X-axes will be denoted by Wx, Wy, and Wz, respectively. The symbol "*" will be used as a multiplication sign. A center of the movable element 101 will be referred to as "origin O", and a positive Y-side and a negative Y-side from the origin O will be referred to as "R-side" and "L-side", respectively. The conveyance direction of the movable element 101 does not always have to be the horizontal direction, and in a case where the conveyance direction is not the horizontal direction, the conveyance direction can yet be defined as the X-direction, and the Y- and Z-directions can yet be defined as described above.

Figure 2:
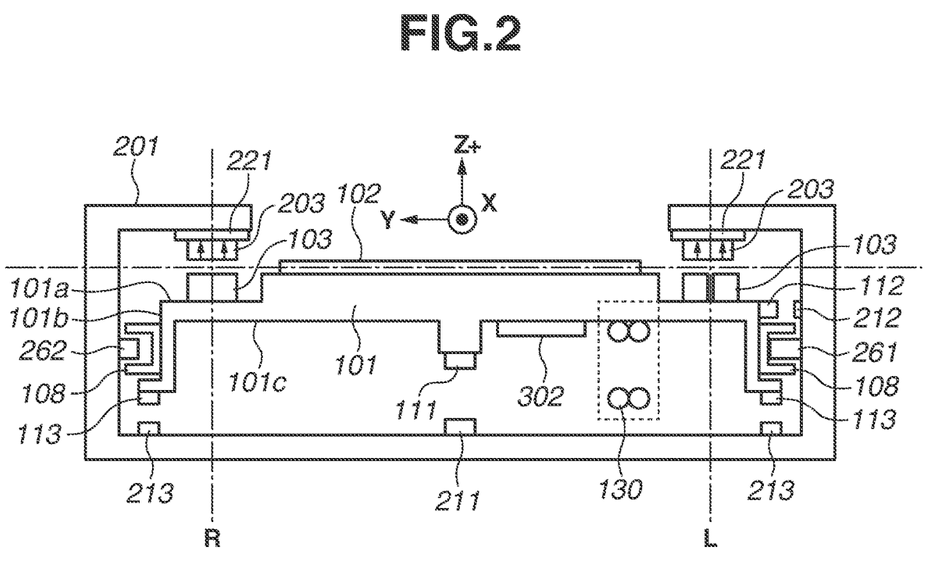
FIG. 2 is a schematic view illustrating an entire configuration of the conveyance system according to the first exemplary embodiment of the present disclosure.

Next, the movable element 101 as a conveyance target of the conveyance system 1 according to the present exemplary embodiment will be described below with reference to FIGS. 1A and 2. FIG. 2 is a schematic view illustrating an entire structure of the conveyance system 1 according to the present exemplary embodiment. FIG. 2 illustrates the movable element 101 and the stator 201 viewed in the X-direction. In FIG. 2, the L-side is a cross section A along a line A-A' specified in FIG. 1A, and the R-side is a cross section B along line B-B' specified in FIG. 1A.

As illustrated in FIGS. 1A and 2, the movable element 101 has an upper surface 101a, a side surface 101b, and a lower surface 101c. Further, the movable element 101 includes coil arrays 103R and 103L each including a plurality of coils 103. While the movable element 101 provided with two coil arrays including the one on the L-side of the upper surface 101a of the movable element 101 and the other on the R-side of the upper surface 101a is described in the present exemplary embodiment, the movable element 101 is not limited to the arrangement and can include one coil array or three or more coil arrays. In the present specification, the upper surface 101a of the movable element 101 faces upward (a surface facing in a positive Z-direction) among surfaces that are parallel to the X-direction, which is the conveyance direction, and perpendicular to the vertical direction (Z-direction) that is at right angles to the X-direction. The lower surface 101c of the movable element 101 faces downward (a surface that faces a negative Z-direction) among the surfaces that are parallel to the X-direction, which is the conveyance direction, and perpendicular to the vertical direction (Z-direction) that is at right angles to the X-direction. The side surface 101b of the movable element 101 faces the stator 201 among surfaces that are parallel to the X-direction, which is the conveyance direction, and parallel to the vertical direction (Z-direction) that is at right angles to the X-direction.

As illustrated in FIG. 1A, coils 103a1R to 103a3R, 103b1R to 103b6R, and 103c1R to 103c3R are in the R-side of the upper surface 101a of the movable element 101. Each center of the coils 103a1R to 103a3R and 103c1R to 103c3R is at a distance rx3 from an origin Om, which is the center of the movable element 101, in the Y-direction to the R-side. Each midpoint between the coils 103b1R and 103b4R, between the coils 103b2R and 103b5R, and between the coils 103b3R and 103b6R is at the distance rx3 from the origin Om, which is the center of the movable element 101, in the Y-direction to the R-side.

Coils 103a1L to 103a3L, 103b1L to 103b6L, and 103c1L to 103c3L are in the L-side of the upper surface 101a of the movable element 101. Each center of the coils 103a1L to 103a3L and 103c1L to 103c3L is at the distance rx3 from the origin Om, which is the center of the movable element 101, in the Y-direction to the L-side. Each midpoint between the coils 103b1L and 103b4L, between the coils 103b2L and 103b5L, and between the coils 103b3L and 103b6L is at the distance rx3 from the origin Om, which is the center of the movable element 101, in the Y-direction to the L-side.

An area of the upper surface 101a of the movable element 101 between areas where the coils 103 are disposed in the R-side and L-side is an area where the work 102 to be conveyed is placed.

The coil arrays 103R and 103L are disposed in the upper surface 101a of the movable element 101 along the X-direction. Specifically, the coil array 103R is disposed on the R-side of the upper surface 101a of the movable element 101. The coil array 103L is disposed in the L-side of the upper surface 101a of the movable element 101. Hereinafter, unless discrimination is necessary, each coil of the movable element 101 will be referred to as "coil 103". In a case where discrimination between the R- and L-sides is unnecessary but each coil 103 needs to be, or at least should be, identified individually, the coil 103 is identified individually using the identifier using the lowercase letter and the number and without the letter "R" or "L" at the end of the reference numeral. In a case of FIG. 1A, the coils 103 are individually identified as "coils 103a1 to 103a3", "coils 103b1 to 103b6", or "coils 103c1 to 103c3".

The coil 103a1R is disposed on one end of the R-side of the upper surface 101a of the movable element 101 in the X-direction, and the coil 103c3R is disposed on the other end in the X-direction. The coils 103b1R to 103b6R are disposed on the R-side of the upper surface 101a of the movable element 101 between the coils 103a3R and 103c1R. The coils 103a1R to 103a3R, for example, are aligned on a line R-R along the X-direction at equal distances in the X-direction. Further, the coils 103c1R to 103c3R, for example, are aligned on the line R-R along the X-direction at equal distances in the X-direction. The coils 103b1R to 103b3R and the coils 103b4R to 103b6R are disposed in two rows on opposite sides across the line R-R and at equal distances along the X-direction.

The coil 103a1L is disposed on one end of the L-side of the upper surface 101a of the movable element 101 in the X-direction, and 103c3L is disposed on the other end in the X-direction. The coils 103b1L to 103b6L are disposed on the L-side of the upper surface 101a of the movable element 101 between the coils 103a3L and 103c1L. The coils 103a1L to 103a3L, for example, are aligned on a line L-L along the X-direction at equal distances in the X-direction. The coils 103c1L to 103c3L, for example, are aligned on the line L-L along the X-direction at equal distances in the X-direction. The coils 103b1L to 103b3L and the coils 103b4L to 103b6L are disposed in two rows on opposite sides across the line L-L and at equal distances along the X-direction.

The coils 103a1L to 103a3L and 103c1L to 103c3L are disposed at corresponding positions to the coils 103a1R to 103a3R and 103c1R to 103c3R1, respectively, in the X-direction. The coils 103b1R and 103b4R are disposed at corresponding positions to the coils 103b1L and 103b4L, respectively, in the X-direction. The coils 103b2R and 103b5R are disposed at corresponding positions to the coils 103b2L and 103b5L, respectively, in the X-direction. The coils 103b3R and 103b6R are disposed at corresponding positions to the coils 103b3L and 103b6L, respectively, in the X-direction.

The center of the coil 103a2R and the center of the coil 103c2R are at a distance ry3 away toward one side and the other side of the movable element 101 in the X-direction, respectively, from where a line extended from the origin Om (the center of the movable element 101) in the Y-direction intersects at right angles with the line R-R. The center of the coil 103a2L and the center of the coil 103c2L are at the distance ry3 away toward one side and the other side of the movable element 101 in the X-direction, respectively, from where the line extended from the origin Om in the Y-direction intersects at right angles with the line L-L. The centers of the coils 103a1 to 103a3 and 103c1 to 103c3 are at the distance rx3 away from where a line extended from the respective centers in the Y-direction intersects at right angles with a line extended from the origin Om in the X-direction. While the coils 103b are disposed so that an intermediate line between a line connecting the centers of the coils 103b1 to 103b3 and a line connecting the centers of the coils 103b4 to 103b6 is at the distance rx3 away from the origin O in the Y-direction are described above as an example, the coils 103b are not limited to the example.

Three sets of two coils 103, i.e., the coils 103b1R and 103b4R, 103b2R and 103b5R, and 103b3R and 103b6R are included in a coil group and the two coils 103 of each set are disposed along the Y-direction. Three sets of two coils 103, i.e., the coils 103b1L and 103b4L, 103b2L and 103b5L, and 103b3L and 103b6L are included in a coil group and the two coils 103 of each set are disposed along the Y-direction. The number of coils 103b that are disposed along the Y-direction is not limited to two. Further, an arrangement direction of the coils 103b does not always have to be perpendicular to the X-direction, which is the conveyance direction, and can be any direction that intersects with the X-direction.

The coils 103aR are a group of three coils 103 disposed along the X-direction, and so are the coils 103cR, the coils 103aL, and the coils 103cL. The number of coils 103a that are disposed along the X-direction is not limited to three and can be any number greater than one, and the number of coils 103c that are disposed along the X-direction is not limited to three and can be any number greater than one.

In the present exemplary embodiment, a group of coils 103 disposed along the X-direction is sometimes referred to as "first coil group". A group of a plurality of sets of two coils 103 disposed along a direction that intersects with the X-direction is sometimes referred to as "second coil group". Specifically, the second coil group according to the present exemplary embodiment are the group of the sets of coils 103b1L and 103b4L, 103b2L and 103b5L, and 103b3L and 103b6L and the group of the sets of coils 103b1R and 103b4R, 103b2R and 103b5R, and 103b3R and 103b6R. In the present exemplary embodiment, the coils 103b1L and 103b4L, the coils 103b2L and 103b5L, and the coils 103b3L and 103b6L are sometimes referred to as "103b1·4L", "103b2·5L", and "103b3·6L", respectively. Further, the coils 103b1R and 103b4R, the coils 103b2R and 103b5R, and the coils 103b3R and 103b6R are sometimes referred to as "103b1·4R", "103b2·5R", and "103b3·6R", respectively.

Each coil 103 can be a coil with a core or a coreless coil. In the present exemplary embodiment, each coil 103 is a coil with a magnetic iron-core (core) in a magnetic circuit. Therefore, a strong magnetic attractive force is generated between the core of the coil 103 and a permanent magnet 203, and this contributes to the levitation of the movable element 101. The coil 103 with the core is suitable especially in a case where the movable element 101 or the work 102 placed on the movable element 101 has a large mass. The core of the coil 103 can be any core with which a magnetic attractive force is generated between the core and at least one permanent magnet 203. Desirably, the core of the coil 103 is disposed to face the plurality of permanent magnets 203.

The movable element 101 includes the plurality of coils 103 disposed symmetrically on the R- and L-sides across a central axis of the upper surface 101a of the movable element 101 along the X-axis as an axis of symmetry. Electric currents of the plurality of coils 103 are controlled, for example, in units of three coils 103. The unit of electric current application control on the coils 103 will be referred to as "coil unit". When an electric current is applied to the plurality of coils 103, an electromagnetic force is generated between the plurality of coils 103 and the plurality of permanent magnets 203 of the stator 201 and acts on the movable element 101. The movable element 101 with the plurality of coils 103 is moved while the orientation of the movable element 101 is controlled in six axes by the electromagnetic force received by the plurality of permanent magnets 203 of the stator 201.

The movable element 101 is movable in the X-direction along the plurality of permanent magnets 203 disposed in two rows along the X-direction. The movable element 101 is conveyed with the work 102, which is a conveyance target, held by the upper surface 101a or the lower surface 101c of the movable element 101. The movable element 101 can include, for example, a holding mechanism that holds the work 102, such as a work holder.

Next, the stator 201 of the conveyance system 1 according to the present exemplary embodiment will be described below with reference to FIGS. 1B and 2. FIG. 1B illustrates the permanent magnets 203 viewed in the Z-direction.

The stator 201 includes the plurality of permanent magnets 203 disposed in two rows along the X-direction, which is the conveyance direction of the movable element 101. The plurality of permanent magnets 203 is disposed on the stator 201 to face the coils 103 of the upper surface 101a of the movable element 101. The stator 201 extends in the X-direction, which is the conveyance direction of the movable element 101, and forms the conveyance path of the movable element 101. The plurality of permanent magnets 203 is disposed on the stator 201 with a yoke 221 therebetween and faces toward a lower part of the stator 201. The yoke 221 is made of a high-permeability material such as iron. The plurality of permanent magnets 203 is disposed at predetermined intervals along the conveyance direction of the movable element 101 and is alternately magnetized. A reference position of the stator 201 in the X-direction will be denoted by Of.

The movable element 101 to be conveyed on the stator 201 includes an encoder 111, a Y-sensor 112, a Z-sensor 113, a movable element controller 302, and a cable 130. The stator 201 includes a scale 211, a Y-target 212, and a Z-target 213. The encoder 111 is disposed on, for example, a bottom portion of the movable element 101. The scale 211 is disposed on the stator 201 along the X-direction to face the encoder 111 of the movable element 101. The encoder 111 detects a pattern of the scale 211 and detects the distance of the movable element 101 in the X-direction from a reference position of the scale 211. The Y-target 212 is, for example, disposed along the X-direction to face the Y-sensor 112 disposed on the side surface 101$b$ of the movable element 101. The Y-sensor 112 measures the distance between the Y-sensor 112 and the Y-target 212 in the Y-direction. The Z-target 213 is, for example, disposed along the X-direction to face the Z-sensor 113 disposed on the bottom portion of the movable element 101. The Z-sensor 113 measures the distance between the Z-sensor 113 and the Z-target 213 in the Z-direction. Desirably, three Z-sensors 113 (113$b$L, 113$f$L, 113$c$R) are disposed, i.e., two are disposed in the L-side and one is disposed in the R-side. The encoder 111, the Y-sensor 112, the Z-sensor 113, the coil 103, and the cable 130 are connected to the movable element controller 302. The cable 130 is connected to, for example, an integrated controller 301, which will be described below, of the stator 201. Further, the cable 130 is desirably guided by a cable carrier system such as a Cableveyor® so that the movable element 101 is not stressed by the cable 130.

The plurality of permanent magnets 203 is disposed in two rows along the X-direction and disposed in the stator 201 to face the coils 103 on the R-side and the L-side of the upper surface 101$a$ of the movable element 101. The plurality of permanent magnets 203 in one row on the R-side is disposed along the X-direction to face the coils 103$a$R, 103$b$R, and 103$c$R on the R-side of the movable element 101. Further, the plurality of permanent magnets 203 in the other row on the L-side is disposed along the X-direction to face the coils 103$a$L, 103$b$L, and 103$c$L on the L-side of the movable element 101.

A guide member 108 is disposed on the movable element 101. Desirably, the guide member 108 is disposed on the side surface 101$b$ of the movable element 101 along the X-direction. Further, a Z-roller 262 and a Y-roller 261 are disposed on the stator 201. The guide member 108 desirably has, for example, a C- or U-shaped cross section. With the C- or U-shaped cross section, the guide member 108 can surround the Z-roller 262 and the Y-roller 261.

The plurality of Z- and Y-rollers 262 and 261 is disposed on the stator 201 along the conveyance direction (first direction (X-direction)). While the Z-roller 262 is disposed on the R-side and the Y-roller 261 on the L-side in FIG. 2 as an example, the Z-roller 262 and the Y-roller 261 can be disposed on the R-side and on the L-side, respectively.

With the guide member 108, an amount of movement of the movable element 101 is regulated. Specifically, in a case where the movable element 101 is moved by a predetermined amount or more in the Z-direction, the Z-roller 262 comes into contact with the inside of the guide member 108 and prevents the movable element 101 from moving further. Similarly, in a case where the movable element 101 is moved by a predetermined amount or more in the Y-direction, the Y-roller 261 comes into contact with the inside of the guide member 108 and prevents the movable element 101 from moving further.

While the guide member 108 is disposed on the movable element 101 and the Z-roller 262 and the Y-roller 261 are disposed on the stator 201 in the present exemplary embodiment as an example, the guide member 108 can be disposed on the stator 201. In this case, the Z-roller 262 and the Y-roller 261 are disposed on the side surface 101$b$ of the movable element 101 along the X-direction (first direction).

Next, the coil unit will be described below with reference to FIGS. 3A to 3C.

In the present exemplary embodiment, the coil unit includes the first coil group including six coils 103 disposed along the first direction. Further, the coil unit 1031 includes the second coil group including three coil sets each including two coils 103 disposed along a second direction intersecting with the first direction. Specifically, the coil unit 1031 including the six coils 103 of the first coil group and the six coils 103 of the second coil group is taken as an example, but the coil unit 1031 is not limited to the above-described example. FIG. 3A illustrates a coil unit 103R viewed from the positive Z-direction. The coil unit 103R includes twelve coils 103$a$1R to 103$a$3R, 103$b$1R to 103$b$6R, and 103$c$1R to 103$c$3R. The permanent magnet 203 is a permanent magnet on the stator 201.

Each coil 103 is connected to the movable element controller 302, and the amounts of electric current of the six coils 103$a$1R to 103$a$3R and 103$c$1R to 103$c$3R are controlled independently of each other.

Electric currents having the same magnitude are applied to the coils 103$b$1R and 103$b$4R, respectively, in different directions from each other. Similarly, electric currents having the same magnitude are applied to the coils 103$b$2R and 103$b$5R, respectively, in different directions from each other, and electric currents having the same magnitude are applied to the coil 103$b$3R and 103$b$6R, respectively, in different directions from each other.

Actions of the coils 103$b$1R and 103$b$4R will be described below with reference to FIG. 6.

Figure 6:
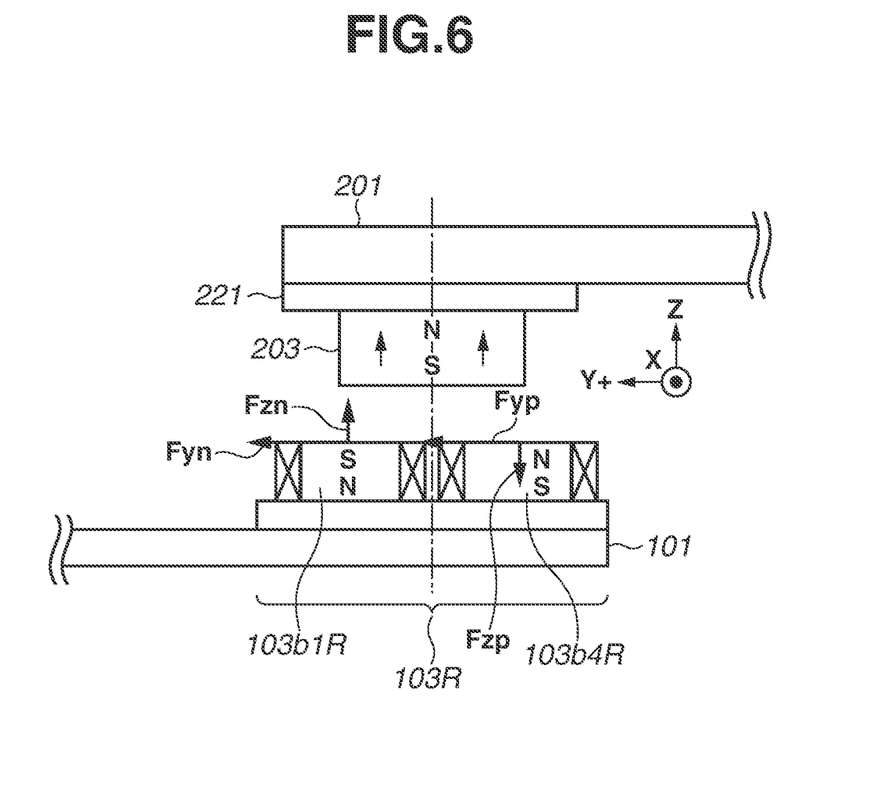
FIG. 6 illustrates actions of coils in the conveyance system according to the first exemplary embodiment of the present disclosure.

Desirably, the coils 103$b$1R and 103$b$4R in FIG. 6 are wire-wound coils and the wire winding direction of the coils 103$b$1R and 103$b$4R is determined such that the magnetic poles of the coils 103$b$1R and 103$b$4R proximate to the permanent magnet 203 are opposite from each other. The present exemplary embodiment is not limited to those described above, and each of the coils 103 can be controlled so that electric currents of the same amplitude are applied in different directions between the coils 103.

For example, as in FIG. 6, an electric current is applied to the coils 103$b$1R and 103$b$4R so that the magnetic pole of the coil 103$b$4R proximate to the permanent magnet 203 is a south pole and the magnetic pole of the coil 103$b$1R proximate to the permanent magnet 203 is a north pole. In a case where the magnetic pole of the permanent magnet 203 proximate to the coils 103 is magnetized in a south pole, forces Fyn and Fyp act on the coils 103$b$1R and 103$b$4R toward the positive Y side, and therefore the movable element 101 is moved in the positive Y direction.

Meanwhile, forces Fzn and Fzp in the Z-direction act to cancel each other.

As described above, the coil units 103R and 103L each include the six coils 103 for each of which an electric current is controlled independently and the three coil sets each including two coils 103 to which electric currents of the same amplitude are applied in different directions from each other. The six coils 103 for each of which an electric current is controlled independently are the coils 103a1 to 103a3 and 103c1 to 103c3. The three coil sets each including two coils 103 to which electric currents of the same amplitude are applied in different directions from each other are the coils 103b1 and 103b4, the coils 103b2 and 103b5, and the coils 103b3 and 103b6.

Figure 3A:
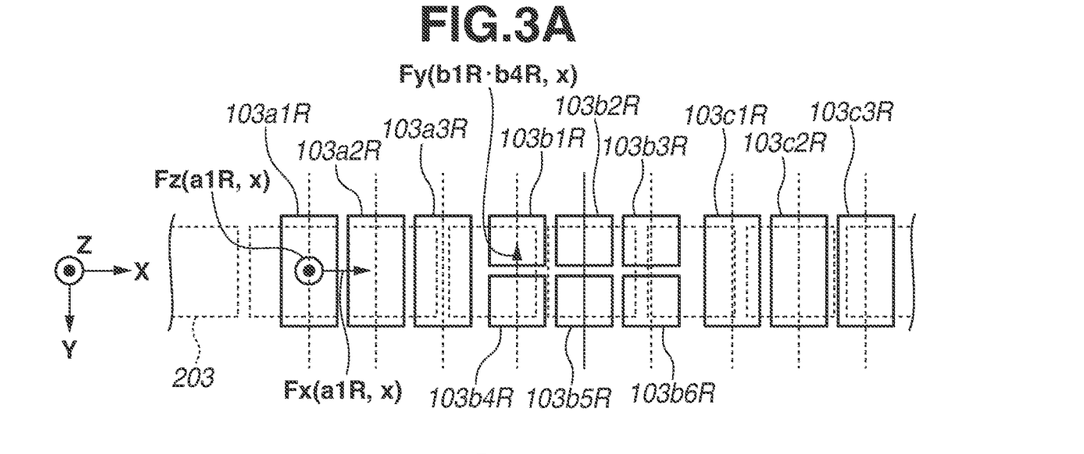
FIGS. 3A and 3B are schematic views illustrating coil groups in the conveyance system according to the first exemplary embodiment of the present disclosure.
Figure 3B:
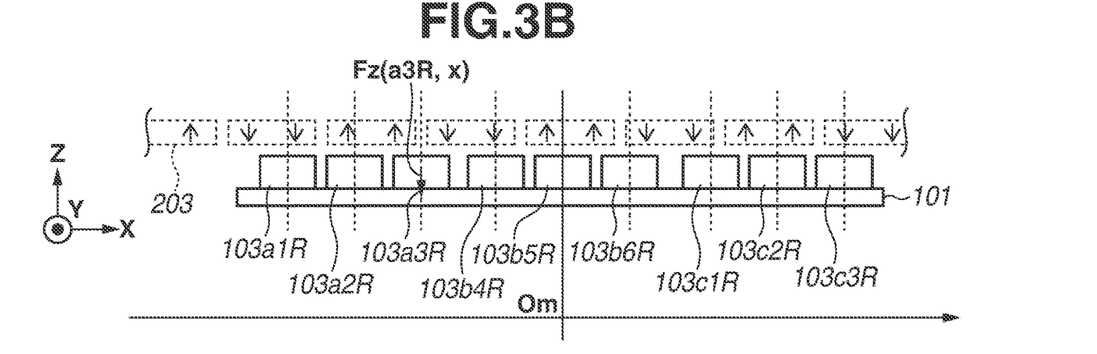

FIG. 3B illustrates the coil unit 103R viewed from the positive Y direction. Each arrow in the permanent magnets 203 schematically indicates a magnetization direction in the permanent magnets 203.

Figure 3C:
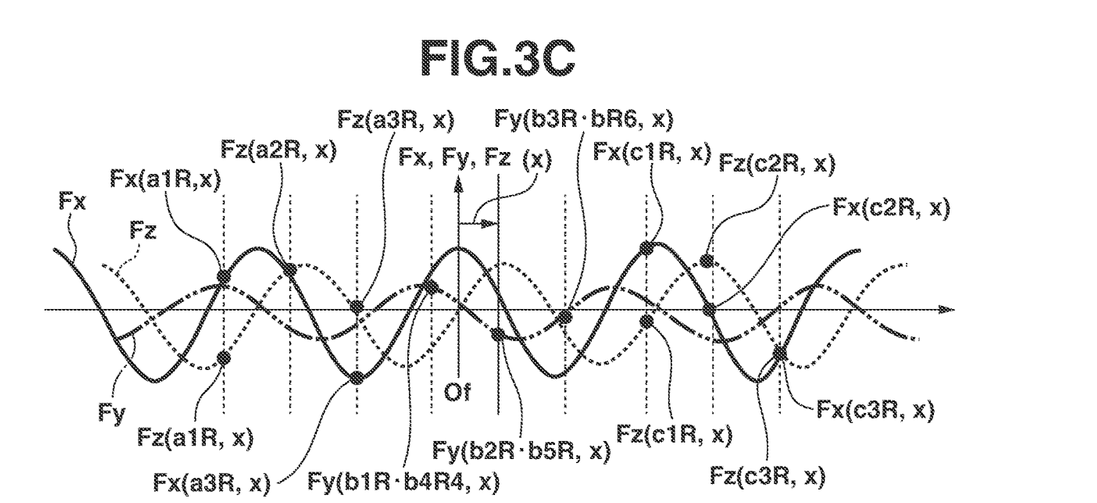
FIG. 3C illustrates magnitudes of forces generated by application of an electric current to the coil groups in the conveyance system according to the first exemplary embodiment of the present disclosure.

FIG. 3C is a thrust constant profile schematically illustrating the magnitudes of a force Fx in the X-direction, a force Fy in the Y-direction, and a force Fz in the Z-direction that are generated when a unit electric current is applied to the coils 103 of the coil unit 103R.

A distance to the origin Om, which is a reference position of the movable element 101, viewed from the reference position Of of the stator 201 is denoted by X.

In response to an electric current applied to the coils 103a1R to 103a3R and 103c1R to 103c3R, forces are generated mainly in the X- and Z-directions. A force generated in the Y-direction is small enough to be ignored.

In response to an electric current applied to the coils 103b1R and 103b4R, the coils 103b2R and 103b5R, and the coils 103b3R and 103b6R, forces are generated mainly in the Y-direction as illustrated in FIG. 6. Forces are also generated slightly in the −X and Z-directions but are small enough to be ignored.

In FIGS. 3A and 3C, for example, Fx(a1R, x) schematically indicates the magnitude of a force in the X-direction that is generated in response to a unit electric current applied to the coil 103a1R in a case where the position of the movable element 101 in the X-direction is a position x. The first and second parameters in the parentheses of Fx are a coil index and the position of the movable element 101 in the X-direction, respectively.

Similarly, in FIGS. 3B and 3C, Fz(a3R, x) indicates the magnitude of a force in the Z-direction that is generated in response to a unit electric current applied to the coil 103a3R in a case where the position of the movable element 101 in the X-direction is the position x.

Similarly, in FIGS. 3A and 3C, Fy(b1R·b4R, X) indicates the magnitude of a force in the Y-direction that is generated in response to a unit electric current applied to the coils 103b1R and 103b4R in a case where the position of the movable element 101 in the X-direction is the position x.

Desirably, in regard to the sizes of the permanent magnets 203 and the coils 103, the size of three coils 103 matches with the size of two permanent magnets 203. The same applies to the coil unit 103L.

Figure 4A:
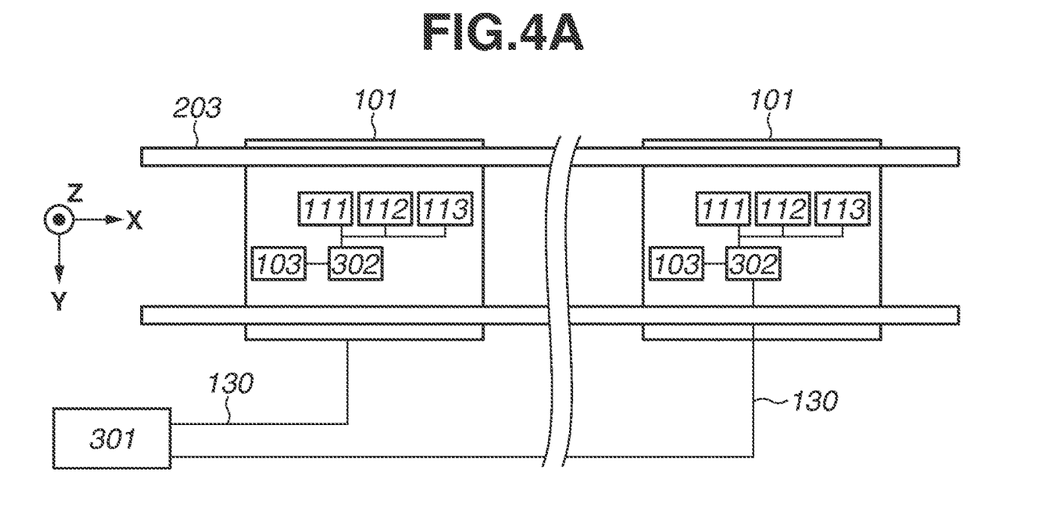
FIG. 4A is a schematic view illustrating a control system that controls the conveyance system according to the first exemplary embodiment of the present disclosure.

Next, a control system that controls the conveyance system 1 according to the present exemplary embodiment will be described below with reference to FIG. 4A. FIG. 4A is a schematic view illustrating a control system that controls the conveyance system 1 according to the present exemplary embodiment.

As illustrated in FIG. 4A, the control system includes the integrated controller 301 and the movable element controller 302 and functions as a control apparatus that controls the conveyance system 1 including the movable element 101 and the stator 201.

The coil 103, the encoder 111, the Y-sensor 112, and the Z-sensor 113 are connected to the movable element controller 302 to communicate with each other. The movable element controller 302 is connected to the integrated controller 301 via the cable 130 and receives a conveyance instruction and power supply from the integrated controller 301. The movable element controller 302 controls the amount of electric current of each connected coil 103 individually.

The movable element controller 302 calculates the position and orientation of the movable element 101 based on outputs from the encoder 111, the Y-sensor 112, and the Z-sensor 113.

Further, the movable element controller 302 determines an electric current instruction value to be applied to the plurality of coils 103 based on the position of the movable element 101 and changes in the position.

As described above, the integrated controller 301 and the movable element controller 302 function as a control apparatus, convey the movable element 101 along the stator 201 without physical contact, and control the orientation of the movable element 101 to be conveyed in six axes.

A method of detecting an X-coordinate of the position of the movable element 101 will be described below with reference to FIG. 2.

In FIG. 2, the encoder 111 on the movable element 101 reads the pattern of the scale 211 on the stator 201 and acquires the X-coordinate of the movable element 101 in the conveyance direction.

The encoder 111 and the scale 211 can be of an absolute position detection type or a combination of an incremental encoder and an appropriate reset signal.

A method of detecting a Y-coordinate of the position of the movable element 101 will be described below with reference to FIGS. 1 and 2.

The Y-sensor 112 is a sensor that detects the distance between the Y-sensor 112 and the Y-target 212. The Y-target 212 is disposed continuously along the conveyance path.

Detection values of the movable element 101 that are detected by the Y-sensors 112bR and 112fR are respectively denoted by Y112bR and Y112fR.

In a case where the coordinates of the Y-sensors 112bR and 112fR are expressed as (a2, b) and (−a2, b), respectively, a Y-position of the movable element 101 and the rotation amount Wz about the Z-axis are calculated by the following formulas 1a and 1b:

$$Y = (Y112bR + Y112fR)/2 \quad \text{(1a), and}$$

$$Wz = (Y112bR - Y112fR)/(2*a2) \quad \text{(1b).}$$

A method of detecting a Z-position of the movable element 101 will be described below with reference to FIGS. 1A and 2.

The Z-sensor 113 is a sensor that detects the distance between the Z-sensor 113 and the Z-target 213. The Z-target 213 is disposed continuously along the conveyance path.

The Z-sensor 113 is provided at three or more positions on the movable element 101.

For example, the XY coordinates of the positions 113bL, 113fL, and 113cR of the Z-sensors 113 at the three positions as illustrated in FIG. 1A are respectively expressed as (−a, −b), (a, −b), and (0, b). An orientation and Z-position Z of the movable element 101, the rotation amount Wy about the Y-axis, and the rotation amount Wx about the X-axis are calculated by the following formulas 1c, 1d, and 1e:

$$Z=(Z113bL+Z113fL+Z113cR)/3 \quad (1c),$$

$$Wx=(Z113cR-(Z113bL+Z113fL)/2)/(2*b) \quad (1d), \text{ and}$$

$$Wy=(Z113bL-Z113fL)/(2*a) \quad (1e),$$

where Z113bL, Z113fL, and Z113cR are detection values of the Z-sensors 113, respectively.

Figure 5:
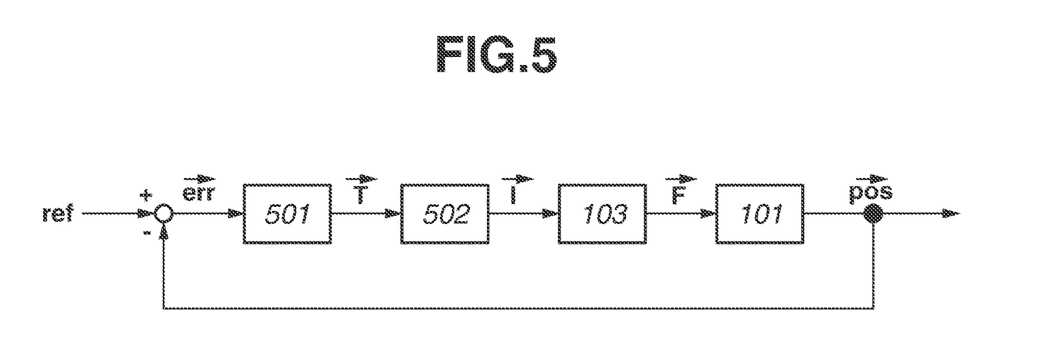
FIG. 5 illustrates a movable element controller in the conveyance system according to the first exemplary embodiment of the present disclosure.

Next, a method of controlling the orientation of the movable element 101 by the movable element controller 302 will be described below with reference to FIG. 5. FIG. 5 schematically illustrates a control loop for calculating the magnitude of a force to be applied to the movable element 101.

A target value ref is a target value of the orientation of the movable element 101 that is specified by the integrated controller 301, and a current position pos is orientation information about the movable element 101 that is acquired from the Y- and Z-sensors 112 and 113. An orientation controller 501 calculates a torque T to be applied to the movable element 101 based on a difference err between the target value ref and the current position pos.

An electric current I to be applied to the coil unit 103 is determined based on the calculated torque T, and in response to output of a desired electric current, the output acts as a force F on the movable element 101 and is eventually detected as a current position pos.

The orientation controller 501 can be, for example, a proportional-integral-derivative (PID) controller. Alternatively, a filter can be placed as needed in accordance with a characteristic of the movable element 101 to stabilize the orientation of the movable element 101.

A torque T to be applied to the movable element 101 is expressed by formula 2 below. Components Tx, Ty, and Tz are three-axis components of the torque T and are an X-direction component, a Y-direction component, and a Z-direction component of the torque T, respectively. Further, components Twx, Twy, and Twz are three-axis components of a moment and are a component of the moment about the X-axis, a component of the moment about the Y-axis, and a component of the moment about the Z-axis, respectively. By controlling the six-axis components Tx, Ty, Tz, Twx, Twy, and Twz of the torque T, the conveyance system 1 according to the present exemplary embodiment controls conveyance of the movable element 101 while controlling the orientation of the movable element 101 in six axes.

$$T=(Tx,Ty,Tz,Twx,Twy,Twz) \quad (2).$$

First, a general formula to be satisfied by a desired torque T will be specified.

A coil number index of the six coils 103 and the three sets of two coils 103 on the right side of the movable element 101 will be denoted by j. The coil number index is, for example, 103a1R, 103a2R, 103a3R, 103b1·4R, 103b2·5R, 103b3·6R, 103c1R, 103c2R, and 103c3R.

Further, coil number indexes 103a1L, 103a2L, 103a3L, 103b1·4L, 103b2·5L, 103b3·6L, 103c1L, 103c2L, and 103c3L of the six coils 103 and the three sets of two coils 103 on the left side of the movable element 101 will also be denoted by j.

$$Tx=\Sigma Ij*Fx(j,x) \quad (3a),$$

$$Ty=\Sigma Ij*Fy(j,x) \quad (3b),$$

$$Tz=\Sigma Ij*Fz(j,x) \quad (3c),$$

$$Twx=-\Sigma j*Fz(j,x)*Yj \quad (3d),$$

$$Twy=\Sigma Ij*Fz(j,x)*Xj \quad (3e), \text{ and}$$

$$Twz=\Sigma Ij*Fx(j,x)*Yj-/Ij*Fy(j,x)*Xj \quad (3f),$$

where Ij is the magnitude of an electric current to be applied to the jth coil, (Xj, Yj) are the coordinates of the jth coil, and Σ is a sum in a case where j is changed from 1 to 18.

Thus, in a case where an electric current value Ij that satisfies formulas 3a to 3f is determined, a desired torque T is applied.

The above-described electric current value Ij has eighteen degrees of freedom (the six coils 103 and the two sets (R- and L-sides) of the three sets of two coils 103) whereas the torque T has six degrees of freedom, so that there are numerous solutions of the electric current value Ij. Thus, an appropriate constraint condition is set to obtain a solution of the electric current value Ij.

Next, a method of uniquely determining the coil electric current value Ij will be described below. In expressions of forces described below, forces that respectively act in the X-, Y-, and Z-directions are denoted by x, y, and z, respectively, and the R-side on the positive Y-side, the negative Y-side, a positive X side, a negative X-side, and a center in FIG. 1A are denoted by R, L, F, b, and c, respectively.

In FIG. 1A, force vectors F that act on the coils 103 on the R- and L-sides, respectively, are expressed as follows. Each force F that acts on the corresponding coil 103 is an electromagnetic force generated between the permanent magnets 203 and the plurality of coils 103 to which an electric current is applied. The permanent magnets 203 and the plurality of coils 103 to which the electric current is applied generate an electromagnetic force in the X-direction, which is the conveyance direction of the movable element 101, as well as electromagnetic forces in the Y- and Z-directions different from the X-direction.

The forces F generated from the coils 103 in FIGS. 1A and 3A are as follows:

FxbL: a force in the X-direction that is generated from the coils 103a1L, 103a2L, and 103a3L, FzbL: a force in the Z-direction that is generated from the coils 103a1L, 103a2L, and 103a3L, FycL: a force in the Y-direction that is generated from the coils 103b1·4L (coils 103b1L and 103b4L), 103b2·5L (coils 103b2L and 103b5L), and 103b3·6L (coils 103b3L and 103b3L), FxfL: a force in the X-direction that is generated from the coils 103c1L, 103c2L, and 103c3L, FzfL: a force in the Z-direction that is generated from the coils 103c1L, 103c2L, and 103c3L, FxbR: a force in the X-direction that is generated from the coils 103a1R, 103a2R, and 103a3R, FzbR: a force in the Z-direction that is generated from the coils 103a1R, 103a2R, and 103a3R, FycR: a force in the Y-direction that is generated from the coils 103b1·4R (coils 103b1R and 103b4R), 103b2·5R (coils R103b2R and 103b5R), and 103b3·6R (coils 103b3R and 103b6R), FxfR: a force in the X-direction that is generated from the coils 103c1R, 103c2R, and 103c3R, and FzfR: a force in the Z-direction that is generated from the coils 103c1R, 103c2R, and 103c3R.

A force F is defined as $$F=(FxbL,FzbL,FycL,FxfL,FzfL,FxbR,FzbR,FycR,FxfR,FzfR).$$

The f torques T (Tx, Ty, Tz, Twx, Twy, Twz) are respectively calculated by the following formulas 4a, 4b, 4c, 4d, 4e, and 4f:

$$Tx = FxfR + FxbR + FxfL + FxbL \quad (4a),$$

$$Ty = FycL + FycR \quad (4b),$$

$$Tz = FzbR + FzbL + FzfR + FzfL \quad (4c),$$

$$Twx = \{(FzfL + FzbL) - (FzfR + FzbR)\} \cdot 2 \cdot rx3 \quad (4d),$$

$$Twy = \{(FzfL + FzfR) - (FzbL + FzbR)\} \cdot 2 \cdot ry3 \quad (4e), \text{ and}$$

$$Twz = \{(FxfL + FxbL) - (FxfR + FxbR)\} \cdot 2 \cdot rx3 \quad (4f).$$

Since the force F has ten degrees of freedom, in order to calculate the force F from the torque T having six degrees of freedom, four constraints are further introduced.

In order to equally distribute the forces F that act on the same axis, constraints of the following three formulas are introduced:

$$FxfR = FxbR \quad (4g),$$

$$FxfL = FxbL \quad (4h), \text{ and}$$

$$FycL = FycR \quad (4i).$$

Further, in order to equally distribute rotation forces about the Y-axis to the L- and R-sides, the following constraint is introduced:

$$FzfR - FzbR = FzfL - FzbL \quad (4j).$$

Once the torque T is determined from the ten formulas 4a to 4j, the force F is determined.

Up to this point, ten force vectors F are uniquely determined.

A method of uniquely determining an electric current value of the coils 103 from this point will be described below.

FxbL and FzbL are expressed as follows using electric current values Ia1L, Ia2L, and Ia3L of the coils 103a1L, 103a2L, and 103a3L and the magnitudes of the thrust constant profile:

$$FxbL = Fx(a1L,x) \cdot IL1 + Fx(a2L,x) \cdot Ia1L + Fx(a3L,x) \cdot Ia3L \quad (5a), \text{ and}$$

$$FzbL = Fz(a1L,x) \cdot Ia1L + Fz(a2L,x) \cdot Ia2L + Fz(a3L,x) \cdot Ia3L \quad (5b).$$

Then, the following constraint $$Ia1L + Ia2L + Ia3L = 0 \quad (5c)$$

is introduced, and therefore three independent conditions are acquired with respect to the unknown numbers Ia1L, Ia2L, and Ia3L, so that the electric current values Ia1L, Ia2L, and Ia3L are uniquely determined.

By a similar method, electric current values Ic1L, Ic2L, and Ic3L are determined from FxfL and FzfL:

$$FxfL = Fx(c1L,x) \cdot Ic1L + Fx(c2L,x) \cdot Ic2L + Fx(c3L,x) \cdot Ic3L \quad (6a),$$

$$FzbL = Fz(c1L,x) \cdot Ic1L + Fz(c2L,x) \cdot Ic2L + Fz(c3L,x) \cdot Ic3L \quad (6b), \text{ and}$$

$$Ic1L + Ic2L + Ic3L = 0 \quad (6c).$$

By a similar method, electric current values Ia1R, Ia2R, and Ia3R are determined from FxbR and FzbR:

$$FxbR = Fx(a1R,x) \cdot Ia1R + Fx(a2R,x) \cdot Ia2R + Fx(a3R,x) \cdot Ia3R \quad (7a),$$

$$FzbR = Fz(a1R,x) \cdot Ia1R + Fz(a2R,x) \cdot Ia2R + Fz(a3R,x) \cdot Ia3R \quad (7b),$$

and $$Ia1R + Ia2R + Ia3R = 0 \quad (7c).$$

By a similar method, electric current values Ic1R, Ic2R, and Ic3R are determined from FxfR and FzfR:

$$FxfR = Fx(c1R,x) \cdot Ic1R + Fx(c2R,x) \cdot Ic2R + Fx(c3R,x) \cdot Ic3R \quad (8a),$$

$$FzbR = Fz(c1R,x) \cdot Ic1R + Fz(c2R,x) \cdot Ic2R + Fz(c3R,x) \cdot Ic3R \quad (8b),$$

and $$Ic1R + Ic2R + Ic3R = 0 \quad (8c).$$

Next, a method of determining electric current values I(b1·4L), I(b2·5L), I(b3·6L), I(b1·4R), I(b2·5R), and I(b3·6R) from FycL and FycR will be described below.

The electric current values I(b1·4L), I(b2·5L), and I(b3·6L) are uniquely determined from, in addition to $$FycL = Fy((b1\cdot 4L),x) \cdot I(b1\cdot 4L) + Fy((b2\cdot 5L),x) \cdot I(b2\cdot 5L) + Fy((b3\cdot 6L),x) \cdot I(b3\cdot 6L) \quad (9a),$$

$$I(b1\cdot 4L) + I(b2\cdot 5L) + I(b3\cdot 6L) = 0 \quad (9b), \text{ and}$$

$$I(b1\cdot 4L):I(b2\cdot 5L):I(b3\cdot 6L) = Fy((b1.3L),x):Fy((b2\cdot 5L),x):Fy((b3\cdot 6L),x),$$

i.e., $$I(b3\cdot 6L) \cdot Fy((b1\cdot 4L),x) = I(b2\cdot 5L) \cdot Fy((b2\cdot 5L),x) = I(b1\cdot 4L) \cdot Fy((b3\cdot 6L),x) \quad (9c).$$

Similarly, electric current values I(b1·4R), I(b2·5R), and I(b3·6R) are uniquely determined from, in addition to $$FycR = Fy((b1\cdot 4R),x) \cdot I(b1\cdot 4R) + Fy((b2\cdot 5R),x) \cdot I(b2\cdot 5R) + Fy((b3\cdot 6R),x) \cdot I(b3\cdot 6R) \quad (9d),$$

$$I(b1\cdot 4R) + I(b2\cdot 5R) + I(b3\cdot 6R) = 0 \quad (9e), \text{ and}$$

$$I(b1\cdot 4R):I(b2\cdot 5R):I(b3\cdot 6R) = Fy((b1\cdot 4R),x):Fy((b2\cdot 5R),x):Fy((b3\cdot 6R),x),$$

i.e., $$I(b3\cdot 6R) \cdot Fy((b1\cdot 4R),x) = I(b2\cdot 5R) \cdot Fy((b2\cdot 5R),x) = I(b1\cdot 4R) \cdot Fy((b3\cdot 6R),x) \quad (9f).$$

By controlling the electric currents to be applied to the plurality of coils 103 as described above, the movable element controller 302 controls each of the six-axis components of the force to be applied to the movable element 101.

By determining and controlling the electric current instruction values of the electric currents to be applied to the plurality of coils 103 as described above, the movable element controller 302 controls contactless conveyance of the movable element 101 on the stator 201 while controlling the orientation of the movable element 101 on the stator 201 in six axes. Specifically, the movable element controller 302 functions as a conveyance control unit that controls conveyance of the movable element 101, and controls contactless conveyance of the movable element 101 on the stator 201 by controlling the electromagnetic forces that the permanent magnets 203 receive from the plurality of coils 103. Further, the movable element controller 302 functions as an orientation control unit that controls the orientation of the movable element 101, and controls the orientation of the movable element 101 on the stator 201 in six axes.

As described above, according to the present exemplary embodiment, the plurality of coils 103 in two rows applies a six-axis force of the three-axis force components Tx, Ty, and Tz and the three-axis moment components Twx, Twy, and Twz to the movable element 101. In this way, conveyance of the movable element 101 is controlled while the orientation of the movable element 101 is controlled in six axes. According to the present exemplary embodiment, by using the coils 103 in two rows, which is less than the number of six-axis components of the force that are variable numbers to be controlled, conveyance of the movable element 101 can be controlled while the orientation of the movable element 101 is controlled in six axes.

Thus, according to the present exemplary embodiment, since the number of rows of coils 103 is reduced contactless conveyance of the movable element 101 of which orientation of the movable element 101 is controlled can be realized without an increase in system size or complication of the system. Furthermore, according to the present exemplary embodiment, since the number of rows of coils 103 is reduced, a downsized and inexpensive magnetic levitation type conveyance system can be realized.

While the permanent magnets 203 are disposed in the stator 201 in the present exemplary embodiment, not a permanent magnet but a soft magnetic material can be used, and an electric current is applied to the coils 103 of the movable element 101 to generate a force between the soft magnetic material of the stator 201 and the coils 103 of the movable element 101. This realizes contactless conveyance or rotation of the movable element 101 by a simple structure while the orientation of the movable element 101 is controlled. In the present specification, a hard magnetic material, such as a permanent magnet, or a soft magnetic material are referred to as "magnetic body".

Second Exemplary Embodiment

Figure 4B:
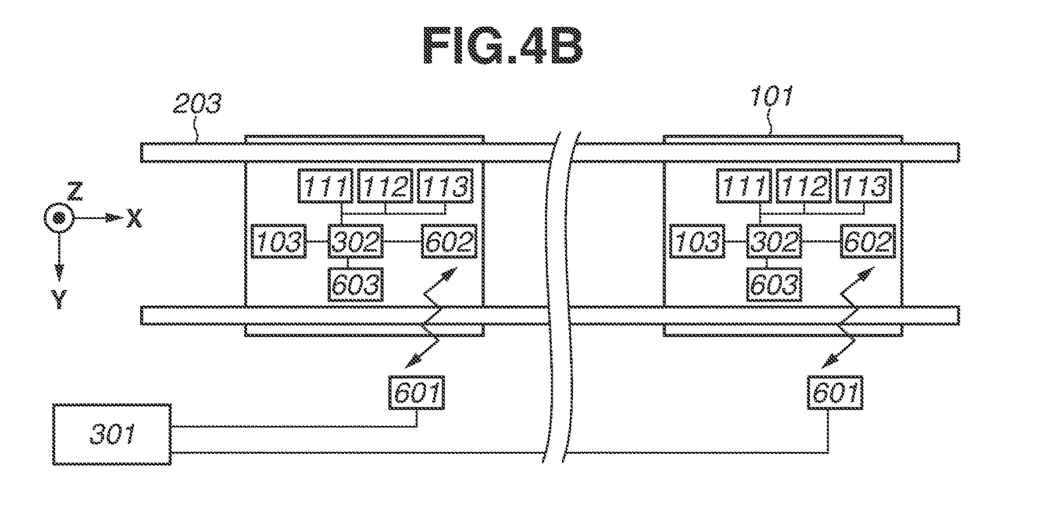
FIG. 4B is a schematic view illustrating a control system that controls a conveyance system according to a second exemplary embodiment of the present disclosure.

A second exemplary embodiment will be described below with reference to FIG. 4B. FIG. 4B is a schematic view illustrating a control system that controls the conveyance system 1 according to the present exemplary embodiment. A component that is the same as or similar to a component in the first exemplary embodiment is given the same reference numeral, and redundant descriptions of the component are omitted or simplified.

A basic structure of the movable element 101 according to the present exemplary embodiment is substantially the same as that in the first exemplary embodiment. In the first exemplary embodiment, the movable element controller 302 and the integrated controller 301 are connected via the cable 130.

The movable element controller 302 according to the present exemplary embodiment receives conveyance instructions wirelessly from the integrated controller 301.

In FIG. 4B, a wireless unit 601 of the stator 201, a wireless unit 602 of the movable element 101, and a battery 603 are added in place of the cable 130 in FIG. 4A. The wireless units 601 and 602 are desirably a 5G wireless unit because the latency is low.

According to the present exemplary embodiment, since the movable element 101 is cableless, a more precise contactless state is realized. Thus, the present exemplary embodiment is suitable for a deposition apparatus that moves in a high vacuum. [Modified Examples]

The present disclosure is not limited to the above-described exemplary embodiments, and various modifications can be made.

For example, in a case of a use in a vacuum environment or underwater environment, organic substances may be released or leak from a plastic member used around the coils 103 or in a core material. Similarly, an adhesive for insulation may partially leak or deteriorate.

Thus, especially in an environment without much dust, such as a vacuum environment, underwater environment, or a clean room, it is desirable to cover the coils 103 and parts near the coils 103 with a component for insulation from an ambient environment.

While there are various insulation methods, it is suitable to cover a single or plurality of coils with a metal box and fill the inside with gas.

Further, in order to exhaust and release heat generated by the coils 103 to the outside, the gas is desirably a gas with high thermal conductivity. For example, helium gas is desirable, or hydrogen gas can be used.

Nitrogen gas, carbon dioxide gas, and atmosphere are also adequate enough to protect the parts near the coils 103.

Further, a coil array including a plurality of coil box units each including a single or plurality of coils that is collectively arranged and disposed in box shape can be employed.

While, in the exemplary embodiment, only the electromagnetic forces are used as a levitation force that the coils 103 receive from the permanent magnets 203 to levitate the movable element 101, the present disclosure is not limited to those described above. For example, in a case where the mass of the movable element 101 or the mass of the work 102 held on the upper surface 101a or the lower surface 101c of the movable element 101 is so large that a great levitation force is to be applied in the vertical direction, a static pressure generated by a fluid, such as air, can additionally be used for levitation to supplement the levitation force.

While, in the present exemplary embodiment, the first coil group 103 is disposed in two rows, the present disclosure is not limited to those described above. For example, the first coil group 103 can be disposed in three, four, or five rows. The present disclosure realizes six-axis control of the orientation of the movable element 101 using a smaller number of rows of coils 103 than the number of variable numbers, i.e., six, in the six-axis control of the orientation of the movable element 101.

A conveyance system according to an exemplary embodiment of the present disclosure can be used as a conveyance system that conveys a work together with a movable element to a working area of processing apparatuses, such as machine tools, that perform processing on the work to be processed into an article, in a system of manufacturing an article such as an electronic device. The processing apparatuses that perform processing can be any apparatuses such as an apparatus that assembles parts and a work, a coating apparatus, and a deposition apparatus. An article to be manufactured is not limited to a particular article and can be any parts.

As described above, an article is manufactured by conveying a work to the working area using the conveyance system according to the exemplary embodiment of the present disclosure and processing the work conveyed to the working area. With the conveyance system according to the exemplary embodiment of the present disclosure, an increase in system size and complication of the system are avoided as described above. Thus, in the system of manufacturing an article using the conveyance system according to the exemplary embodiment of the present disclosure in conveying a work, the apparatuses that perform processing are arranged with a high degree of freedom without an increase in system size or complication of the system.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-221444, filed Dec. 6, 2019, which is hereby incorporated by reference herein in its entirety.

What is claimed is:

1. A conveyance system comprising:
a movable element including a first coil group and a second coil group, wherein the first coil group includes a plurality of first coils disposed along a first direction, and the second coil group includes a plurality of second coils disposed along a second direction intersecting with the first direction; and
a stator including a plurality of magnetic bodies disposed in a row along the first direction so that the plurality of magnetic bodies is capable of facing the first coil group and the second coil group,
wherein, in a case where electric current is applied to the first coil group or the second coil group, a force is generated between the movable element and the plurality of magnetic bodies disposed in the row,
wherein the movable element is capable of moving in the first direction along the plurality of magnetic bodies disposed in the row, and
wherein two second coils included in the second coil group are disposed at positions where the two second coils are capable of facing the plurality of magnetic bodies disposed in the row along the first direction.

2. The conveyance system according to claim 1, wherein the first coil group or the second coil group is configured to generate a force between the first coil group or the second coil group and the plurality of magnetic bodies in a direction different from the first direction.

3. The conveyance system according to claim 1,
wherein the movable element has an upper surface along the first direction, and
wherein the first coil group and the second coil group are disposed on the upper surface.

4. The conveyance system according to claim 3,
wherein each of the plurality of first coils and the plurality of second coils includes a core that is configured to act an attractive force between the core and the plurality of magnetic bodies, and
wherein the core is configured to face the plurality of magnetic bodies.

5. The conveyance system according to claim 1, wherein, among the plurality of magnetic bodies, adjacent magnetic bodies have magnetic pole polarities different from each other.

6. The conveyance system according to claim 5, wherein, among the plurality of second coils in the second coil group, magnetic pole polarities to be generated in second coils adjacent in the second direction are different from each other.

7. A method of manufacturing an article using the conveyance system according to claim 1, the method comprising:
processing a work while conveying the work using the movable element of the conveyance system according to claim 1.

8. The conveyance system according to claim 1,
wherein, in a case where electric current flows, the electric current flows to the first coil group so that the first coil group generates a force to be applied along the first direction of the movable element and a third direction that is a vertical direction between the first coil group and the plurality of magnetic bodies, and
wherein, in the case where electric current flows, the electric current flows to the second coil group so that the second coil group generates a force to be applied to the movable element along the second direction between the second coil group and the plurality of magnetic bodies.

9. The conveyance system according to claim 1, wherein directions of currents that flow to two adjacent coils included in the second coil group are different from each other.

10. The conveyance system according to claim 1, wherein the second direction is a horizontal direction intersecting the first direction.

* * * * *